United States Patent
Matsushita et al.

(10) Patent No.: US 10,189,432 B2
(45) Date of Patent: Jan. 29, 2019

(54) VEHICLE OCCUPANT RESTRAINT DEVICE

(71) Applicants: Autoliv Development AB, Vårgårda (SE); Tetsuya Matsushita, Yokohama (JP); Gaku Morita, Yokohama (JP)

(72) Inventors: Tetsuya Matsushita, Yokohama (JP); Gaku Morita, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/509,012

(22) PCT Filed: Aug. 27, 2015

(86) PCT No.: PCT/JP2015/074231
§ 371 (c)(1),
(2) Date: Mar. 6, 2017

(87) PCT Pub. No.: WO2016/039160
PCT Pub. Date: Mar. 17, 2016

(65) Prior Publication Data
US 2017/0259774 A1    Sep. 14, 2017

(30) Foreign Application Priority Data
Sep. 8, 2014   (JP) .................... 2014-182651

(51) Int. Cl.
*B60R 21/231* (2011.01)
*B60N 2/427* (2006.01)
(Continued)

(52) U.S. Cl.
CPC ........ *B60R 21/23138* (2013.01); *B60N 2/427* (2013.01); *B60R 21/207* (2013.01);
(Continued)

(58) Field of Classification Search
CPC ............ B60R 21/23138; B60R 21/207; B60R 21/2338; B60R 21/2342;
(Continued)

(56) References Cited

U.S. PATENT DOCUMENTS

| | | |
|---|---|---|
| 5,322,322 A | 6/1994 | Bark et al. |
| 5,464,246 A | 11/1995 | Castro et al. |

(Continued)

FOREIGN PATENT DOCUMENTS

| | | |
|---|---|---|
| CA | 2193371 A1 | 11/1999 |
| DE | 19845992 A1 | 5/1999 |

(Continued)

OTHER PUBLICATIONS

Japan Patent Office, 3-4-3, Kasumigaseki, Chiyoda-ku, Tokyo 100-8915, Japan, International Search Report for International Application No. PCT/JP2014/074231, four pages, Form PCT/ISA/2010.

*Primary Examiner* — Drew J Brown
(74) *Attorney, Agent, or Firm* — Brinks Gilson & Lione

(57) ABSTRACT

An occupant restraining device capable of coping with a plurality of collision directions without additional airbags is provided. An occupant restraining device (100) is adapted to restrain an occupant P sitting in a vehicle seat (110), and the device includes a seatbelt (120) fixed to left and right sides of a seat cushion (116) of the seat to restrain the occupant's hips (P2), airbags (130*a*) and (130*b*) stored inside a seat back of the seat on the left and right sides thereof and inflated and deployed on the left and right sides of the occupant. Tensile fabric (140) is connected to each of the airbags and the seat cushion and applied with tension, when the airbags are inflated and deployed, so as to be extended between the airbags inflated and deployed and both side surfaces of the seat cushion.

18 Claims, 4 Drawing Sheets

(51) Int. Cl.
  *B60R 21/207* (2006.01)
  *B60R 21/2338* (2011.01)
  *B60R 22/12* (2006.01)
  *B60R 22/00* (2006.01)
  *B60R 21/2342* (2011.01)
  *B60R 21/00* (2006.01)
  *B60R 21/215* (2011.01)
  *B60R 21/235* (2006.01)

(52) U.S. Cl.
  CPC .......... *B60R 21/2338* (2013.01); *B60R 22/00* (2013.01); *B60R 22/12* (2013.01); *B60R 21/2342* (2013.01); *B60R 2021/0058* (2013.01); *B60R 2021/21506* (2013.01); *B60R 2021/23107* (2013.01); *B60R 2021/23146* (2013.01); *B60R 2021/23386* (2013.01); *B60R 2021/23509* (2013.01)

(58) Field of Classification Search
  CPC .. B60R 2021/0058; B60R 2021/21506; B60R 2021/23107; B60R 2021/23146; B60R 2021/23386; B60R 2021/23509; B60R 22/00
  See application file for complete search history.

(56) References Cited

U.S. PATENT DOCUMENTS

| | | | | |
|---|---|---|---|---|
| 5,636,862 | A * | 6/1997 | Cheung | B60R 21/207 |
| | | | | 280/730.2 |
| 5,678,852 | A * | 10/1997 | Brown | B60R 21/207 |
| | | | | 280/728.2 |
| 5,730,464 | A * | 3/1998 | Hill | B60R 21/23138 |
| | | | | 280/730.2 |
| 6,029,993 | A | 2/2000 | Mueller | |
| 7,240,915 | B2 * | 7/2007 | Peng | B60R 21/23138 |
| | | | | 280/730.2 |
| 8,690,187 | B2 * | 4/2014 | Fukawatase | B60R 21/207 |
| | | | | 280/730.2 |
| 8,899,619 | B2 * | 12/2014 | Fukawatase | B60R 21/207 |
| | | | | 280/730.2 |
| 9,132,798 | B2 * | 9/2015 | Yasuoka | B60R 21/2334 |
| 9,238,425 | B2 * | 1/2016 | Fukawatase | B60R 21/13 |
| 9,796,351 | B2 * | 10/2017 | Fujiwara | B60R 21/207 |
| 2001/0011810 | A1 | 8/2001 | Saiguchi et al. | |
| 2004/0155436 | A1 | 8/2004 | Saiguchi et al. | |
| 2004/0155446 | A1 | 8/2004 | Saiguchi et al. | |
| 2005/0236819 | A1 * | 10/2005 | Riedel | B60R 21/207 |
| | | | | 280/730.2 |
| 2006/0119083 | A1 | 6/2006 | Peng et al. | |
| 2013/0093224 | A1 * | 4/2013 | Dainese | B60R 21/207 |
| | | | | 297/216.12 |
| 2014/9942733 | | 2/2014 | Fukawatase | |
| 2015/0314748 | A1 * | 11/2015 | Mihm | B60R 21/23138 |
| | | | | 280/730.2 |
| 2015/0367803 | A1 * | 12/2015 | Fujiwara | B60R 21/207 |
| | | | | 280/728.2 |
| 2015/0367804 | A1 * | 12/2015 | Fujiwara | B60R 21/207 |
| | | | | 280/730.2 |
| 2016/0144818 | A1 * | 5/2016 | Mihm | B60R 21/231 |
| | | | | 280/730.2 |
| 2017/0129446 | A1 * | 5/2017 | Kobayashi | B60R 21/23138 |

FOREIGN PATENT DOCUMENTS

| | | | |
|---|---|---|---|
| DE | 69511951 T2 | 1/2000 | |
| DE | 10065464 A1 | 8/2001 | |
| DE | 10032106 A1 * | 1/2002 | ......... B60R 21/207 |
| JP | 2009029182 A | 2/2009 | |
| JP | 2010083384 A | 4/2010 | |
| JP | 2012081958 A * | 4/2012 | ....... B60R 21/23138 |
| JP | 2013159220 A | 8/2013 | |
| JP | 2014012475 A | 1/2014 | |
| JP | 201434356 | 2/2014 | |
| KR | 100249138 B1 | 12/1999 | |
| MX | 9606673 A | 12/1997 | |
| WO | WO 9535226 A1 | 12/1995 | |
| WO | WO 200838523 A1 | 4/2008 | |

* cited by examiner (a)

(b)

VEHICLE OCCUPANT RESTRAINT DEVICE

CROSS REFERENCE TO RELATED APPLICATIONS

This application claims priority to Japanese Patent Application No. 2014-182651, filed on Sep. 8, 2014 and PCT/JP2015/074231, filed on Aug. 27, 2015.

FIELD OF THE INVENTION

The present invention relates to an occupant restraining device configured to restrain an occupant sitting in a vehicle seat.

BACKGROUND

In recent years, airbag devices have become standard equipment for most vehicles. The airbag device is a safety device activated upon an emergency event such as a vehicle collision and inflated and deployed by gas pressure to receive and protect an occupant. There are different kinds of airbag devices for various installation locations or uses. For example, a front airbag is provided in the center of the steering at the driver seat in order to protect the occupant of the front seat against an impact mainly in the front-back direction, and a passenger airbag is provided in the vicinity of a front passenger seat at locations including the instrument panel. In addition, a side curtain airbag that is inflated and deployed along the side windows is provided at the side door area near the roof in order to protect occupants of the front and back seats against a side collision and a subsequent roll over (turn over).

In an occupant protecting device disclosed in Japanese Patent Application Publication No. 2014-034356, a side airbag to be inflated and deployed immediately next to an occupant is provided on each side of a seat. According to the above mentioned reference, occupant's movement to the side opposite to the collision side (one side in the vehicle widthwise direction) that may be caused by reaction against movement to the collision side (the other side in the vehicle widthwise direction) in a collision can be restricted.
[PTL 1]

The airbag device described above is adapted to mainly cope with collisions in various directions such as frontal and side collisions, and airbags for a driver's seat and passenger seats are designed individually to cope with a frontal collision. For a side collision, separate airbags are used depending on the body parts to be protected by the airbags, for example the head is protected by a side curtain airbag, and the chest and abdomen are protected by side airbags. These airbags are supported by reaction force surfaces on the vehicle body side such as side surfaces of the vehicle interior and therefore have high occupant restraining capabilities even when the airbags receive the weight of an occupant in restraining the occupant. However, in order to cope with collisions in more varied directions, additional airbags are used. Such additional airbags may not always secure appropriate reaction force surfaces on the vehicle body side depending on where these airbags are installed, additional spaces for these airbags are not always easily available, and the vehicle weight and device cost might increase as a result.

In view of the problem, it is an object of the present invention to provide an occupant restraining device capable of coping with a plurality of collision directions without additional airbags.

SUMMARY OF INVENTION

In order to solve the problem, an exemplary occupant restraining device according to the present invention is configured to restrain an occupant sitting in a vehicle seat and includes a seatbelt fixed to left and right sides of a seat cushion of the seat to restrain the occupant's hips, airbags stored inside a seat back of the seat on left and right sides thereof and inflated and deployed on left and right sides of the occupant, and tensile fabric connected to each of the airbags and the seat cushion and applied with tension, when the airbags are inflated and deployed, so as to be extended between the airbags inflated and deployed on both side surfaces of the seat cushion.

In the configuration, the airbags stored inside the seat back on the left and right sides thereof are inflated and deployed upon a collision, and the shoulders of the occupant are restrained. In this way, the upper half of the body of the occupant is restricted from moving in the front-back and left-right directions. The occupant's hips are restrained by the seatbelt and prevented from moving in the front-back and left-right directions.

Also in this configuration, when the airbags stored in the left and right side parts of the seat cushion are inflated and deployed, the tensile fabric connected to the airbag and the seat cushion is extended between the airbags and the side surfaces of the seat cushion. In this way, the upper half of the body and the hips of the occupant can surely be restrained, and the occupant's movement in the left-right direction in particular can be restricted. The airbags are connected to the seat cushion through the tensile fabric, so that the movement of the airbags can also be restricted. Therefore, the restraining performance for the upper half of the body of the occupant by the airbags can be increased.

As in the foregoing, in the occupant restraining device according to the present invention, the airbags are only those stored inside the seat back, in other words, side airbags only. Since a vehicle is always equipped with a seatbelt, the tensile fabric is substantially only an additional member. Therefore, high occupant restraining performance can be provided in front-back and left-right collision directions or in a plurality of collision directions without additional airbags.

The seatbelt may be a two-point seatbelt adapted to restrain the occupant's hips. High occupant restraining performance can be provided because the presence of the two-point seatbelt, in particular, as a seatbelt prevents chest compression, which would be caused by the shoulder belt of a three-point seatbelt.

The tensile fabric may be a fabric member integrally connected to each of the airbags through an inside part or a lower part of the seat cushion. In this configuration, inconvenience associated with the tensile fabric such as unsmoothness in a normal state or when the airbags are not inflated and deployed can be prevented. Since the tensile fabric is arranged through the inside part or the lower part of the seat cushion, the tensile fabric is less exposed and does not easily come within sight of the occupant, so that the appearance of the vehicle interior is not affected. Furthermore, the tensile fabric is applied with tension in the lower part of the seat cushion, and this provides an effect of lifting the thighs of the occupant upward. In this way, leg injuries of the occupant that would be caused upon a frontal collision may be reduced.

The tensile fabric may be connected to a surface of the airbag in the inflated and deployed state on an opposite side to a surface contacted by the occupant. In this way, the tensile fabric is connected on the side of the airbag opposite to the surface contacted by the occupant, and therefore the airbag does not lose its flexibility at the surface in contact with the occupant. Therefore, the deformability of the airbag in an inflated and deployed state (when the occupant is restrained) is secured, the airbags can follow the body of the occupant properly. The surface on the opposite side to the surface contacted by the occupant refers to the outer side surface with respect to the occupant. The tensile fabric is connected to the outer side surfaces, and the airbags are restricted from moving to the outer side of the airbag in other words in the direction away from the occupant, so that proper occupant restraining performance can be secured. The tensile fabric can also be effectively prevented from contacting the occupant.

The tensile fabric may have a part exposed upward and outside the seat cushion when the airbag is inflated and deployed. In this way, the advantageous effects by the tensile fabric can be obtained properly. The tensile fabric is exposed upward outside the cushion when the airbag is inflated and deployed, and therefore the tensile fabric is positioned on both sides of the occupant's thighs. Therefore, the tensile fabric can effectively restrain the thighs of the occupant.

The airbag may be deployed in a manner such as to protect at least a shoulder of the occupant and come around to a front side of the occupant. In this way, when the airbags are inflated and deployed, the shoulders of the occupant can be protected while the occupant can be effectively restrained from moving forward.

It is an object of the present invention to provide an occupant restraining device capable of coping with a plurality of collision directions without additional airbags.

DETAILED DESCRIPTION OF INVENTION

Figure 1:
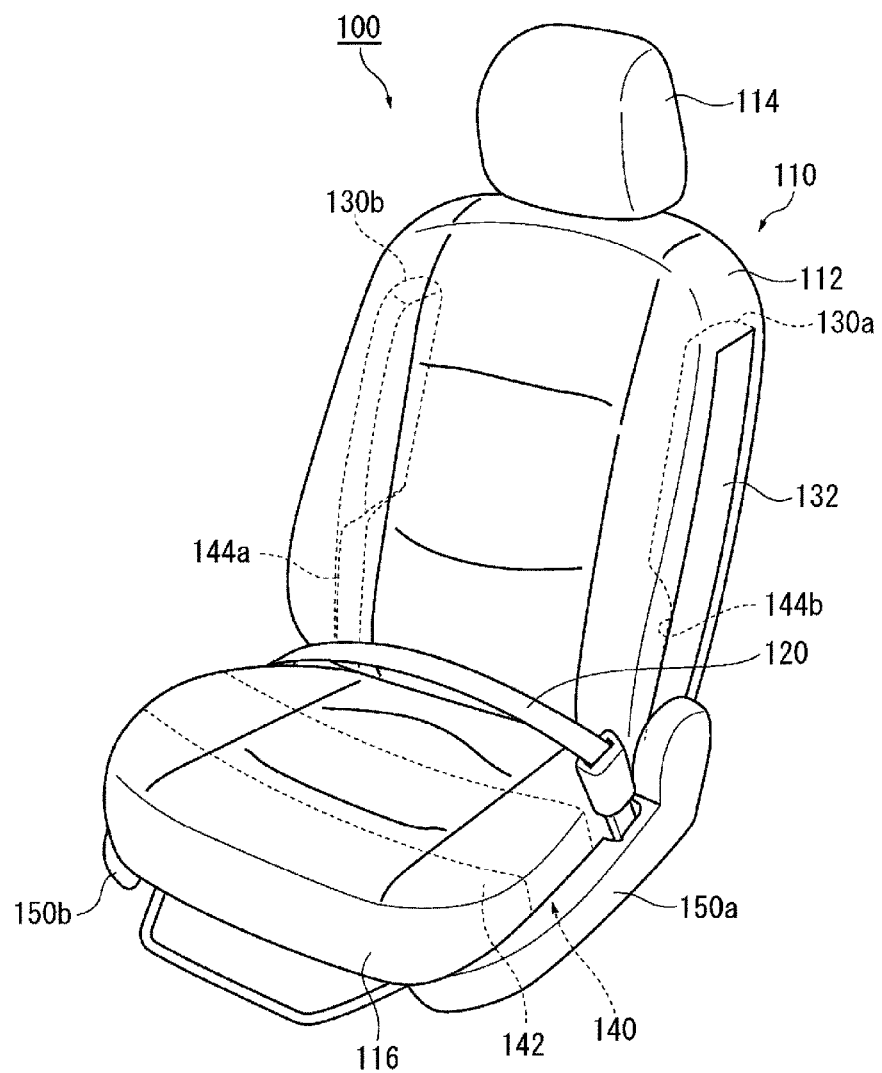
FIG. 1 is an exemplary view of an occupant restraining device according to a first embodiment of the invention.

Preferred embodiments of the present invention will be described in detail in conjunction with the accompanying drawings. The sizes, materials, and other specific numerical values in the following description of the embodiments are simply by way of examples for ease of understanding of the present invention and should not be construed to limit the present invention unless otherwise specified. Note that in the description and the drawings, components having substantially the same functions and configurations are designated by the same reference characters, so that their description is not repeated, and components not directly relevant to the present invention are not shown. In the description of the embodiments, the direction an occupant faces is the front, the opposite direction thereto the back, the rightward direction of the occupant the right, and the leftward direction of the occupant the left.

Figure 2:
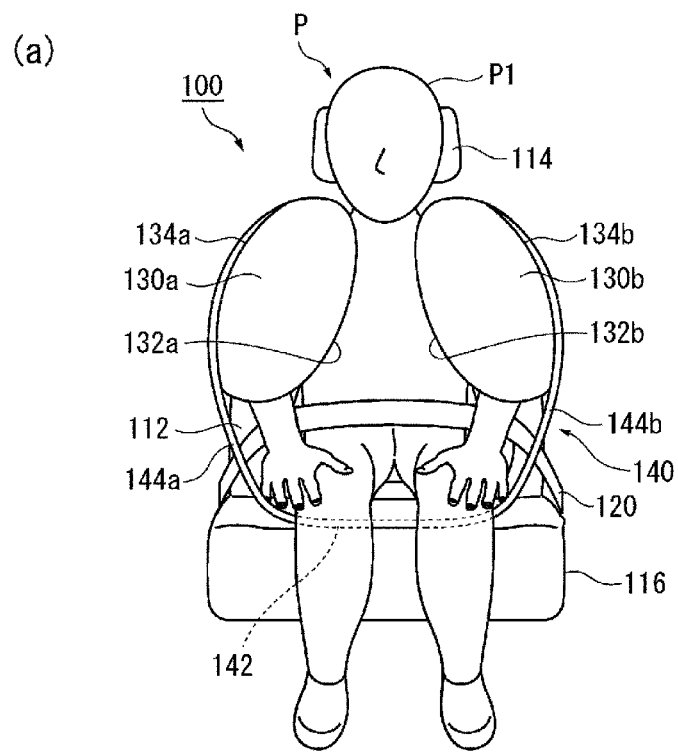
FIGS. 2(*a*) and (*b*) are exemplary views showing a state in which an occupant sits in the seat shown in FIG. 1.
Figure 2:
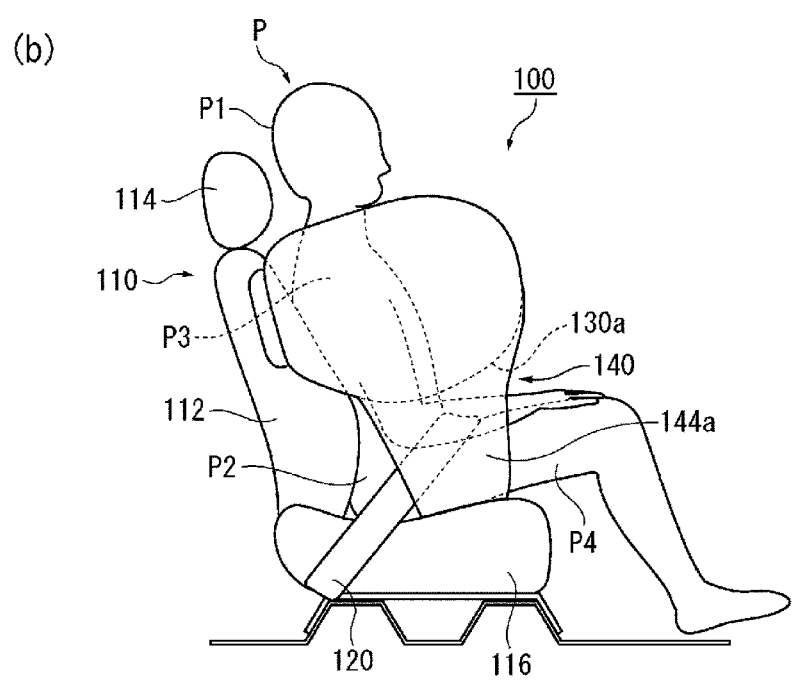

FIG. 1 is an exemplary view of an occupant restraining device 100 according to a first embodiment of the present invention. FIGS. 2(*a*) and (*b*) are exemplary views showing a state in which an occupant P sits in a seat 110 shown in FIG. 1. FIG. 2(*a*) illustrates the state of the seat 110 in FIG. 1 observed from the front of the vehicle, and FIG. 2(*b*) illustrates the state of the seat 110 in FIG. 1 observed from the right side of the vehicle. For ease of understanding, in FIG. 1, the assemblies stored inside the seat 110 (airbags 130*a* and 130*b* and tensile fabric 140 that will be described) are indicated by dashed lines. The airbags 130*a* and 130*b* are not yet inflated and deployed in FIG. 1, while the airbags 130*a* and 130*b* are inflated and deployed in FIGS. 2(*a*) and (*b*).

The device 100 according to the first embodiment restrains the occupant P (see FIGS. 2(*a*) and (*b*)) sitting in the seat 110 of the vehicle (not shown in its entirety). The seat 110 supports the seat back 112 that supports the upper half of the body of the occupant P. A headrest 114 that supports the head P1 of the occupant P is provided above the seat back 112. A seat cushion 116 on which the occupant P sits is provided under the seat back 112. Module storages 150*a* and 150*b* that will be described are provided on the sides of the seat cushion 116.

As illustrated in FIG. 1, the occupant restraining device 100 according to the first embodiment includes a two-point seatbelt 120, the airbags 130*a* and 130*b*, and the tensile fabric 140. The two-point seatbelt 120 is fixed on the left and right sides of the seat cushion 116 of the seat 110 to restrain the hips P2 of the occupant P (see FIGS. 2(*a*) and 2(*b*)). In this way, the hips P2 of the occupant P are restrained from moving in the front-back and left-right directions.

According to the first embodiment in particular, high occupant restraining performance can be provided because the presence of the two-point seatbelt 120 as a seatbelt prevents chest compression, which would be caused by the shoulder belt of a three-point seatbelt. Note that according to the first embodiment, the two-point seatbelt 120 is used as an example, but the invention is not limited to the arrangement, and it is needless to mention that any other kinds of seatbelts including a three-point seatbelt may be employed.

The airbags 130*a* and 130*b* (side airbags) are stored inside the left and right parts, respectively of the seat back 112 of the seat 110 as illustrated in FIG. 1 and covered with a cover 132. The airbags 130*a* and 130*b* are inflated and deployed laterally on the left and right sides of the occupant P, respectively as illustrated in FIGS. 2(*a*) and (*b*) upon a collision and restrain the shoulders P3 of the occupant P. In this way, the movement of the upper half of the body of the occupant P in the front-back direction and the left-right direction is restricted.

The tensile fabric 140 is a member made of fabric (an integral fabric member) connected to each of the airbags 130*a* and 130*b* and the seat cushion 116. In the description of the embodiment, the tensile fabric 140 in an integral shape will be described by referring separately to the part stored in the seat cushion 116 and the part stored in the part other than the seat cushion 116 for ease of understanding. Hereinafter, the part stored in the seat cushion 116 will be referred to as a center part 142 and the parts extending from the center part 142 to the airbags 130*a* and 130*b* and connected to the airbags 130*a* and 130*b* will be referred to as side parts 144*a* and 144*b*.

As illustrated in FIG. 1, the center part 142 of the tensile fabric 140 according to the first embodiment is stored on the inner side of the surface fabric of the seat cushion 116 and connected to the seat cushion 116. The side parts 144*a* and 144*b* are stored in the seat back 112 through the module storages 150*a* and 150*b* and connected to the airbags 130*a* and 130*b*. In this way, inconvenience associated with the tensile fabric 140 such as unsmoothness in a normal state can be prevented. The tensile fabric 140 is not exposed and does not easily come within sight of the occupant P, so that the appearance of the vehicle interior can be maintained appropriately.

Note that according to the first embodiment, the tensile fabric 140 is arranged through the inside of the seat cushion 116, but the invention is not limited to the arrangement. The tensile fabric 140 may be arranged under the seat cushion 116 and still the same effect can be provided. When the tensile fabric 140 is arranged under the seat cushion 116, the tensile fabric 140 is applied with tension in the lower part of the cushion 116. This provides an effect of lifting the thighs P4 of the occupant P upward, so that leg injuries of the occupant P that would be caused in a frontal collision may be reduced. Note however that the tensile fabric 140 may be arranged through inside or under the seat cushion 116 and the advantageous effect results while the possibility of arranging the fabric through the upper surface of the seat cushion 116 is not excluded.

As illustrated in FIGS. 2(a) and 2(b), when the airbags 130a and 130b are inflated and deployed, the tensile fabric 140 is applied with tension. In this way, the tensile fabric 140 tears open the surface fabric at the upper surface of the seat cushion 116 to be exposed to the outside of the cushion 116 and expands between the inflated and deployed airbags 130a and 130b and the side surfaces of the seat cushion 116. Therefore, the presence of the tensile fabric 140 can restrain the upper half of the body and the hips P2 of the occupant P, so that the movement particularly in the left-right direction is optimally restricted.

According to the first embodiment, the airbags 130a and 130b are deployed to come around to the front of the occupant P while protecting the shoulders P3 of the occupant P, so that the forward movement of the occupant P can be effectively restricted. The airbags 130a and 130b are connected to the seat cushion 116 through the tensile fabric 140, so that the movement of the airbags 130a and 130b is also restricted. Therefore, the presence of the airbags 130a and 130b can provide improved occupant restraining performance.

In particular, according to the first embodiment, the tensile fabric 140 is connected to the airbags 130a and 130b through the inner side of the surface fabric of the seat cushion 116 (inside the seat cushion 116). Therefore, when the airbags 130a and 130b are inflated and deployed, the tensile fabric 140 tears open the surface fabric of the seat cushion 116 and is partly exposed upward outside the seat cushion 116. In this way, the tensile fabric 140 is positioned on both sides of the thighs P4 of the occupant P as illustrated in FIG. 2(b). Therefore, the tensile fabric 140 effectively restrains the thighs P4 of the occupant P.

According to the first embodiment, as illustrated in FIG. 2(a), the tensile fabric 140 is connected to the surfaces of the airbags 130a and 130b opposite to the surfaces to be contacted by the occupant P in an inflated and deployed state (hereinafter referred to as the outer side surfaces 134a and 134b). In this way, the surfaces of the airbags 130a and 130b to which the tensile fabric 140 is connected (the outer side surfaces 134a and 134b) have slightly higher rigidity while the surfaces to be contacted by the occupant (hereinafter referred to as the inner side surfaces 132a and 132b) provide flexibility for the airbags 130a and 130b. Therefore, the airbags 130a and 130b can be deformed properly corresponding to the body of the occupant P when inflated and deployed, so that high occupant restraining performance can be obtained.

Furthermore, when the tensile fabric 140 is connected to the outer side surfaces 134a and 134b or on the surfaces on the outer side with respect to the occupant P, the airbags 130a and 130b are restrained from moving to the outer side. In this way, the airbags 130a and 130b are not easily moved away from the occupant, so that the occupant restraining performance can be increased. The tensile fabric 140 can be effectively prevented from contacting the occupant P when the airbags 130a and 130b are inflated and deployed.

As in the foregoing, in the occupant restraining device 100 according to the first embodiment, the occupant restraining performance by the airbags 130a and 130b and the two-point seatbelt 120 can be improved by additionally providing the tensile fabric 140, and the occupant can be restrained appropriately for a load in the front-back and left-right directions. Therefore, the effect of restraining the occupant P in a plurality of collision directions can be obtained without additional airbags.

In this way, since no additional airbags are necessary, there can be no increase in the vehicle weight or the device cost. The space necessary for providing the occupant restraining device 100 according to the first embodiment is only the seat 110. Therefore, an additional space for an additional airbag is not necessary. The arrangement is applicable to all kinds of seats, and therefore design and development especially for a driver's seat, a front passenger's seat, a rear passenger's seat or the kind of vehicle is not necessary. The part cost and design cost can be lowered by using common parts.

Figure 3:
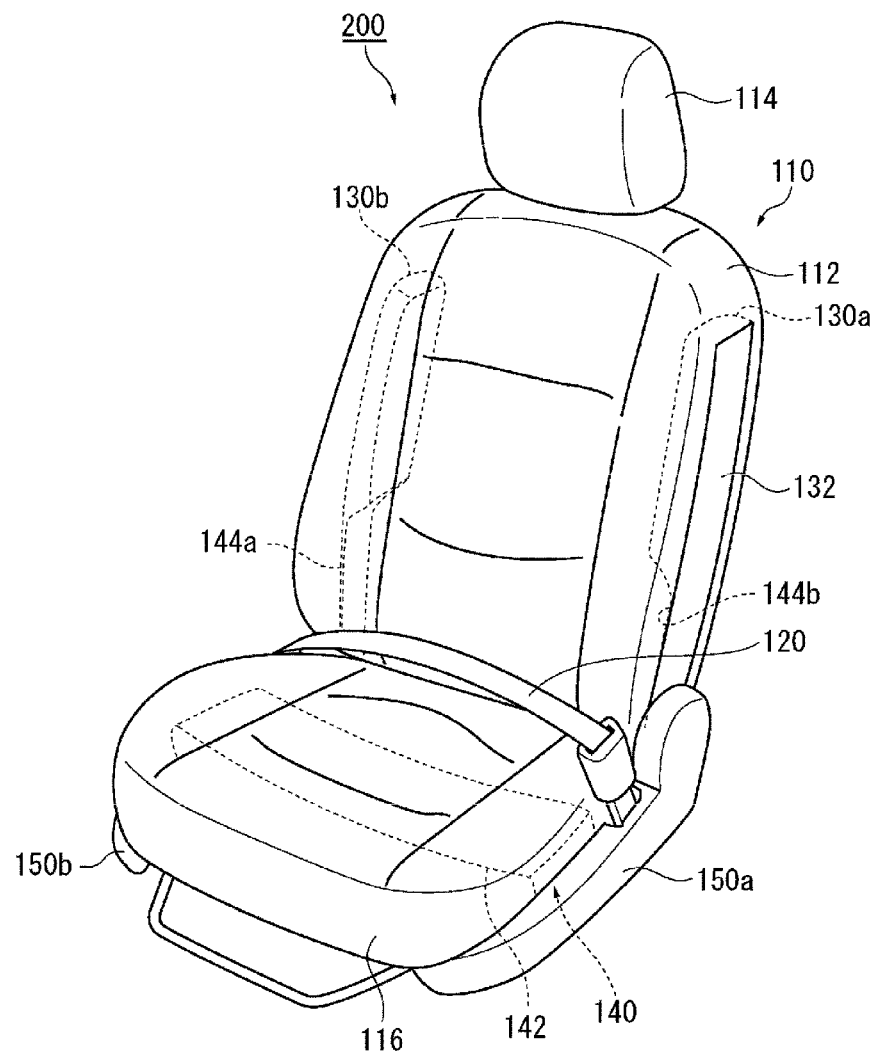
FIG. 3 is an exemplary view of an occupant restraining device according to a second embodiment of the invention.
Figure 4:
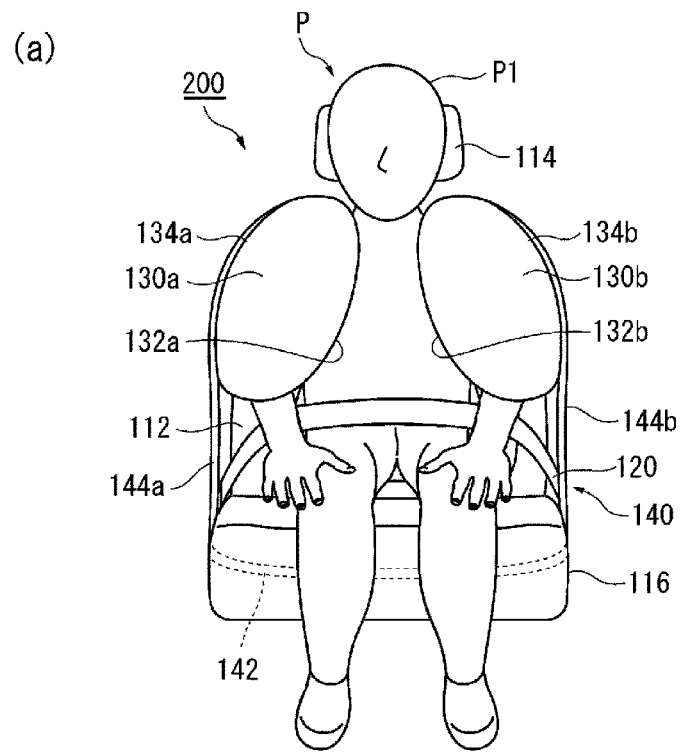
FIGS. 4(*a*) and (*b*) are exemplary views showing a state in which an occupant sits in the seat shown in FIG. 3.
Figure 4:
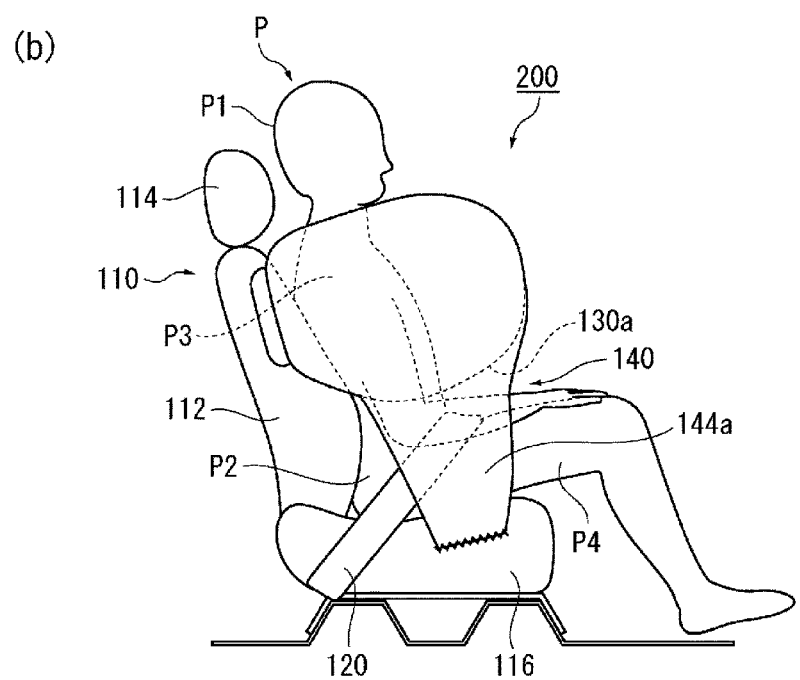

FIG. 3 is an exemplary view of an occupant restraining device 200 according to a second embodiment of the invention. FIGS. 4(a) and (b) are exemplary views of a state in which the occupant P sits in a seat 110 shown in FIG. 3. In the description of the second embodiment, the same components as those of the occupant restraining device 100 according to the first embodiment are designated by the same reference characters, and their description is not provided.

As illustrated in FIGS. 3 and 4(a), in the occupant restraining device 200 according to the second embodiment, the tensile fabric 140 has its center part 142 connected to the inside of the cushion of the seat cushion 116 and stored in the seat cushion 116. The side parts 144a and 144b are stored in the seat back 112 through the module storages 150a and 150b similarly to the first embodiment and connected to the airbags 130a and 130b.

As illustrated in FIG. 4(b), in the occupant restraining device 200 according to the second embodiment, the tensile fabric 140 tears open the surface fabric on the side surfaces of the seat cushion 116 to be exposed outside the seat cushion 116 and expands between the inflated and deployed airbags 130a and 130b and the side surfaces of the seat cushion 116. In this way, when the center part 142 is stored in the cushion of the seat cushion 116, the same effect as the occupant restraining device 100 according to the first embodiment can be provided.

Note that according to the second embodiment, the tensile fabric 140 is an integral fabric member including the center part 142 and the side parts 144a and 144b continuous to the sides thereof, but the arrangement is not limited to the above. For example, the tensile fabric 140 may include the side parts 144a and 144b adapted to expand toward the sides of the occupant when the airbags 130a and 130b are inflated and deployed, so that ends of the side parts 144a and 144b may be connected to the airbags 130a and 130b, respectively, and the other ends thereof may be connected to the seat cushion 116. Also in this way, the same effect as the occupant restraining device 100 according to the first embodiment and the occupant restraining device 200 according to the second embodiment may be provided.

While the preferred embodiments of the present invention have been described with reference to the accompanying drawings, these are preferable embodiments of the invention, and other embodiments can be carried out or implemented in various other ways. In particular, the invention is not limited by detailed shapes, sizes, positional arrangements, and the like of the components shown in the accompanying drawings unless otherwise specified herein. The expressions and terms herein are used for the purpose of description and should not be construed as limiting unless otherwise specified.

While the above description constitutes the preferred embodiment of the present invention, it will be appreciated that the invention is susceptible to modification, variation and change without departing from the proper scope and fair meaning of the accompanying claims.

The invention claimed is:

1. An occupant restraining device configured to restrain an occupant sitting in a vehicle seat, comprising:
    a seatbelt fixed at left and right sides of a seat cushion of the seat to restrain the hip of the occupant;
    left and right airbags stored inside a seat back of the seat on left and right sides respectively thereof and inflated and deployed on left and right sides of the occupant; and
    a tensile fabric connected to each of the left and right airbags and the seat cushion, the tensile fabric placed under tension when the left and right airbags are inflated and deployed, so as to be extended between the left and right airbags inflated and deployed and both side surfaces of the seat cushion, the left and right airbags are deployed such as to protect at least a shoulder of the occupant and come around to a front side of the occupant thereby restricting movement of the occupant in the front-back and the left-right directions,
    wherein the tensile fabric has a first end and a second end, and the tensile fabric in the form of separate left and right tensile fabric components is connected respectively to the left and right airbags at the first end and to the seat cushion at the second end.

2. The occupant restraining device of claim 1, further comprising the seatbelt is a two-point seatbelt adapted to restrain the hip of the occupant.

3. The occupant restraining device of claim 1 further comprising the tensile fabric is connected to a surface of the left and right airbags in the inflated and deployed state on opposite sides to surfaces of the left and right airbags contacted by the occupant.

4. The occupant restraining device of claim 1 further comprising the tensile fabric has a part exposed upward and outside the seat cushion when the left and right airbags are inflated and deployed.

5. The occupant restraining device of claim 1 further comprising the tensile fabric has at least a portion stored under at least one trim cover of the seat, and upon deployment of the respective left or right airbags, the portion tears through the at least one trim cover to be exposed outside the seat cushion.

6. The occupant restraint device of claim 1 further comprising the seatbelt fixed to the left and right sides of the seat cushion and positioned laterally inside of the tensile fabric with respect to the occupant such that upon the left and right airbags being inflated and deployed the tensile fabric is positioned laterally outside of the seatbelt.

7. An occupant restraining device configured to restrain an occupant sitting in a vehicle seat, comprising:
    a seatbelt fixed at left and right sides of a seat cushion of the seat to restrain the hip of the occupant;
    left and right airbags stored inside a seat back of the seat on left and right sides respectively thereof and inflated and deployed on left and right sides of the occupant; and
    a tensile fabric connected to each of the left and right airbags and the seat cushion and placed under tension when the left and right airbags are inflated and deployed, the tensile fabric extending between the left and right airbags when inflated and deployed on both side surfaces of the seat cushion, the tensile fabric is a fabric member connected to each of the left and right airbags through an inside part or a lower part of the seat cushion.

8. The occupant restraining device of claim 7 further comprising the left and right airbags are deployed such as to protect at least a shoulder of the occupant and come around to a front side of the occupant.

9. The occupant restraining device of claim 7, further comprising the seatbelt is a two-point seatbelt adapted to restrain the hip of the occupant.

10. The occupant restraining device of claim 7 further comprising the tensile fabric is connected to a surface of the left and right airbags in the inflated and deployed state on opposite sides to surfaces of the left and right airbags contacted by the occupant.

11. The occupant restraining device of claim 7 further comprising the tensile fabric has a part exposed upward and outside the seat cushion when the left and right airbags are inflated and deployed.

12. The occupant restraining device of claim 7 further comprising the tensile fabric has at least a portion stored under at least one trim cover of the seat, and upon deployment of the respective left or right airbag, the portion tears through the at least one trim cover to be exposed outside the seat cushion.

13. The occupant restraint device of claim 7 further comprising the seatbelt fixed to the left and right sides of the seat cushion and positioned laterally inside of the tensile fabric with respect to the occupant such that upon the left and right airbags being inflated and deployed the tensile fabric is positioned laterally outside of the seatbelt.

14. An occupant restraining device configured to restrain an occupant sitting in a vehicle seat, comprising:
    a seatbelt fixed at left and right sides of a seat cushion of the seat to restrain the hip of the occupant;
    left and right airbags stored inside a seat back of the seat on left and right sides respectively thereof and inflated and deployed on left and right sides of the occupant; and
    a left and a right tensile fabric component connected to the left and right airbags respectively and to the seat cushion, the left and right tensile fabric components placed under tension when the left and right airbags are inflated and deployed, so as to be extended between the left and right airbags inflated and deployed and both side surfaces of the seat cushion for restricting the airbag's movement, the left and right airbags are deployed such as to protect at least a shoulder of the occupant and come around to a front side of the occupant thereby restricting movement of the occupant in the front-back and the left-right directions,
    wherein each of the left and right tensile fabric components has a first end and a second end, and the tensile fabric components are connected respectively to the left and right airbags at the first end and to the seat cushion at the second end.

15. The occupant restraining device of claim 14, further comprising the seatbelt is a two-point seatbelt adapted to restrain the hip of the occupant.

16. The occupant restraining device of claim 14 further comprising the left and right tensile fabric components are connected to a surface of the left and right airbag in the inflated and deployed state on opposite sides to surfaces of the left and right airbags contacted by the occupant.

17. The occupant restraining device of claim 14 further comprising the left and right tensile fabric components each have at least a portion stored under at least one trim cover of the seat, and upon deployment of the respective left or right airbag, the portion tears through the at least one trim cover to be exposed outside the seat cushion.

18. The occupant restraint device of claim 14 further comprising the seatbelt fixed to the left and right sides of the seat cushion and positioned laterally inside of the left and right tensile fabric components with respect to the occupant such that upon the left and right airbags being inflated and deployed the left and right tensile fabric components are positioned laterally outside of the seatbelt.

\* \* \* \* \*